(12) United States Patent
Kim (10) Patent No.: US 10,472,991 B2
(45) Date of Patent: Nov. 12, 2019

(54) FOREIGN SUBSTANCE REMOVAL APPARATUS FOR GAS TURBINE

(71) Applicant: Doosan Heavy Industries & Construction Co., Ltd., Gyeongsangnam-do (KR)

(72) Inventor: Kyung Kook Kim, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 359 days.

(21) Appl. No.: 15/286,074

(22) Filed: Oct. 5, 2016

(65) Prior Publication Data

US 2017/0096912 A1 Apr. 6, 2017

(30) Foreign Application Priority Data

Oct. 5, 2015 (KR) .................. 10-2015-0139937

(51) Int. Cl.
*F02C 7/05* (2006.01)
*F01D 25/32* (2006.01)
(Continued)

(52) U.S. Cl.
CPC ......... *F01D 25/32* (2013.01); *B01D 46/0023* (2013.01); *F01D 5/081* (2013.01);
(Continued)

(58) Field of Classification Search
CPC ... F01D 25/32; B64D 2033/0246; F02C 7/05; F02C 7/052; B01D 46/003;
(Continued)

(56) References Cited

U.S. PATENT DOCUMENTS

2008/0310951 A1* 12/2008 Bremer ............... F01D 5/081
 415/121.2
2011/0247347 A1* 10/2011 Ebert ................... F01D 5/081
 60/806
(Continued)

FOREIGN PATENT DOCUMENTS

EP 2006511 A2 12/2008

OTHER PUBLICATIONS

European Search Report dated Feb. 1, 2017 in European Application No. 16184736.3.

*Primary Examiner* — William H Rodriguez
(74) *Attorney, Agent, or Firm* — Invenstone Patent, LLC (57) ABSTRACT

A foreign substance removal apparatus for a gas turbine includes a combustor casing having a first cooling air passage formed in a tangential direction of a combustor in a gas turbine in order to move cooling air into the combustor, a first foreign substance collection unit disposed on a flow path in the first cooling air passage in order to primarily filter foreign substances contained in the cooling air, a second cooling air passage extending radially toward a turbine blade in a circumferential direction of a torque tube located in the combustor, and a second foreign substance collection unit disposed on a flow path in the second cooling air passage and communicating with the second cooling air passage to secondarily filter foreign substances contained in the cooling air introduced through the first cooling air passage.

20 Claims, 8 Drawing Sheets

(51) Int. Cl.
  *F01D 5/08* (2006.01)
  *B01D 46/00* (2006.01)
  *F01D 5/18* (2006.01)
  *F02C 3/04* (2006.01)
  *F02C 7/18* (2006.01)
  *B64D 33/02* (2006.01)
  *F02C 7/052* (2006.01)

(52) U.S. Cl.
  CPC ............. *F01D 5/187* (2013.01); *F02C 3/04* (2013.01); *F02C 7/18* (2013.01); *B01D 2267/40* (2013.01); *B01D 2279/60* (2013.01); *B64D 2033/0246* (2013.01); *F02C 7/052* (2013.01); *F05D 2220/32* (2013.01); *F05D 2240/35* (2013.01); *F05D 2260/2212* (2013.01); *F05D 2260/607* (2013.01)

(58) Field of Classification Search
  CPC ............ B01D 46/0031; B01D 46/0023; B01D 2267/40; B01D 2279/60; B01D 45/00; B01D 45/02; B01D 45/04; B01D 45/06; B01D 45/08; B01D 50/00; B01D 50/002; F05D 2240/35; F05D 2260/607
  See application file for complete search history.

(56) References Cited

U.S. PATENT DOCUMENTS

| | | |
|---|---|---|
| 2012/0057967 A1 | 3/2012 | Laurello et al. |
| 2018/0209284 A1* | 7/2018 | Day .................... F01D 9/06 |

\* cited by examiner

FOREIGN SUBSTANCE REMOVAL APPARATUS FOR GAS TURBINE

CROSS-REFERENCE TO RELATED APPLICATIONS

This application claims the benefit under 35 U.S.C. § 119 of Korean Patent Application No. 10-2015-0139937, filed Oct. 5, 2015, which is hereby incorporated by reference in its entirety.

BACKGROUND OF THE INVENTION

Field of the Invention

Exemplary embodiments of the present invention relate to a foreign substance removal apparatus for a gas turbine, capable of reducing foreign substances contained in cooling air supplied for cooling gas turbine blades in order to supply only purified cooling air to the turbine blades, while a gas turbine is stably operated.

Description of the Related Art

In typical gas turbines, fuel is mixed with air under the operating conditions of high-temperature and high-pressure, and is then combusted. Foreign substances in the form of particles are adhered to blades or annular members when the gas turbines are used for a long time, thereby causing the performance of gas turbines to be deteriorated. The phenomenon in which such foreign substances are piled and deposited is referred to as "fouling".

When fouling occurs in gas turbines, it may considerably affect the operation and efficiency of the gas turbines. Particles that cause such fouling have a size of 2 to 10 mm or a relatively small size.

In each blade or annular member in which the fouling occurs, the cross-section thereof varies in terms of aerodynamics, thereby causing pressure drop and considerably affecting the performance of gas turbines and the heat rate therein.

BRIEF SUMMARY

Embodiments of the present invention provide a foreign substance removal apparatus for a gas turbine, capable of inhibiting foreign substances from flowing into gas turbine blades while cooling the gas turbine blades in order to stably operate a gas turbine and protect the gas turbine blades.

Embodiments of the present invention can be understood from the following description and become apparent with reference to the embodiments of the present invention. Also, those skilled in the art to which the present invention pertains will clearly understand that the embodiments of the present invention can be realized by the means as claimed and combinations thereof.

In accordance with an embodiment, a foreign substance removal apparatus for a gas turbine includes a combustor casing having a first cooling air passage formed in a tangential direction of a combustor in a gas turbine in order to move cooling air into the combustor, a first foreign substance collection unit disposed on a flow path in the first cooling air passage in order to primarily filter foreign substances contained in the cooling air, a second cooling air passage extending radially toward a turbine blade in a circumferential direction of a torque tube located in the combustor, and a second foreign substance collection unit disposed on a flow path in the second cooling air passage and communicating with the second cooling air passage to secondarily filter foreign substances contained in the cooling air introduced through the first cooling air passage.

The first cooling air passage may include a plurality of first cooling air passages arranged in a circumferential direction of the combustor casing, high-pressure air compressed by a compressor provided in the gas turbine being supplied to the first cooling air passage.

The first cooling air passage may have a reduced diameter in a longitudinal direction thereof.

The first cooling air passage may have a spiral groove portion formed therein.

The first cooling air passage may have a path bent at a lower end thereof toward the second cooling air passage of the torque tube.

The first foreign substance collection unit may be one of a groove and a slit extending outward in a circumferential direction of the combustor casing by a predetermined length.

The first foreign substance collection unit may obliquely extend rearward of the combustor casing in a circumferential direction thereof.

The first foreign substance collection unit may be one of a groove and a slit extending inward of the torque tube facing the first cooling air passage by a predetermined length.

The first foreign substance collection unit may include a plurality of first foreign substance collection units extending in a circumferential direction of the combustor casing and in an inward direction of the torque tube, the first foreign substance collection units facing each other, and the foreign substances in the cooling air introduced through the first cooling air passage may be respectively collected at a circumferential position of the combustor casing and an inward position of the torque tube.

The plurality of first foreign substance collection units may be spaced apart from each other in a longitudinal direction of the combustor casing.

The first foreign substance collection unit may be disposed in a circumferential direction of the combustor casing, and may include a first chamber facing an inner upper portion of the combustor casing and a first filter part provided in the first chamber.

The first chamber may include a plurality of unit filters filtering foreign substances having different sizes.

Each of the unit filters may have a dense mesh spacing as directed outward in the circumferential direction of the combustor casing.

The unit filters may be in close contact with each other, or can be spaced apart from each other.

When the unit filters are spaced apart from each other, a distance (L) therebetween may be relatively greater than that corresponding to a whole thickness (t) of the unit filters.

The second cooling air passage may extend so as to be inclined upward toward the turbine blade in an axial direction of the torque tube.

The second cooling air passage may have a uniform diameter.

The second foreign substance collection unit may be located above the second cooling air passage.

The second foreign substance collection unit may be disposed in the circumferential direction of the torque tube, and may include a diameter reduction part having a reduced diameter as directed outward from a center thereof in a radial direction of the torque tube, and a second chamber formed above the diameter reduction part and having a space for storage of collected foreign substances.

The turbine blade may be a first turbine blade mounted to a first-stage disk adjacent to the combustor.

It is to be understood that both the foregoing general description and the following detailed description of the present invention are exemplary and explanatory and are intended to provide further explanation of the invention as claimed.

BRIEF DESCRIPTION OF THE DRAWINGS

Embodiments of the present invention may be more clearly understood from the following detailed description taken in conjunction with the accompanying drawings, in which.

DESCRIPTION OF SPECIFIC EMBODIMENTS

A foreign substance removal apparatus for a gas turbine according to exemplary embodiments of the present invention will be described below in more detail with reference to the accompanying drawings.

Figure 1:
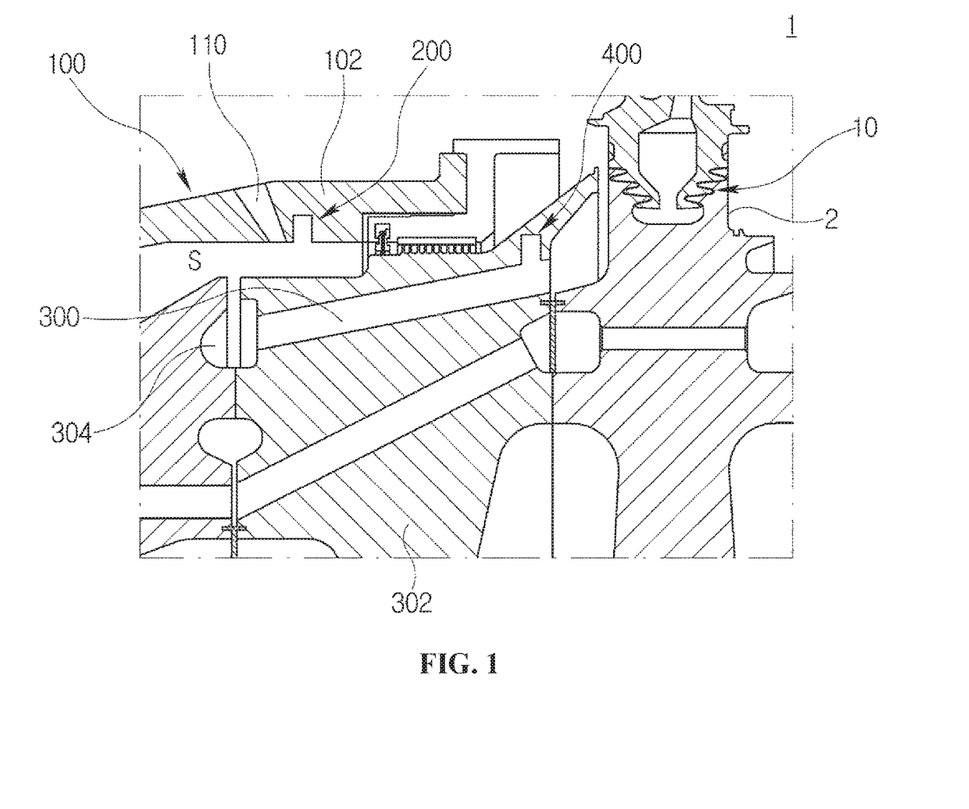
FIG. 1 is a cross-sectional view illustrating a foreign substance removal apparatus for a gas turbine according to an embodiment of the present invention.

Referring to FIG. 1, a foreign substance removal apparatus for a gas turbine 1 according to an embodiment of the present invention is designed in order to inhibit problems caused by a plurality of turbine blades 2, arranged outward circumferentially from a first-stage disk 10 adjacent to a combustor 100, due to the condition of high temperature, and to improve durability thereof.

To this end, the present invention performs cooling by supplying cooling air to the turbine blades 2, and simultaneously increases the efficiency of a gas turbine by extending the service life of the turbine blades 2 exposed under the condition of high temperature.

To this end, the for substance removal apparatus for a gas turbine 1 according to an embodiment of the present invention includes a combustor casing 102 having a first cooling air passage 110 formed in the tangential direction of a combustor 100 in order to move cooling air into the combustor 100, a first foreign substance collection unit 200 disposed on a flow path in the first cooling air passage 110 so as to primarily filter foreign substances contained in the cooling air, a second cooling air passage 300 extending radially toward turbine blades 2 in the circumferential direction of a torque tube 302 located in the combustor 100, and a second foreign substance collection unit 400, which is disposed on a flow path in the second cooling air passage 300 and communicates with the second cooling air passage 300 so as to secondarily filter foreign substances contained in the cooling air introduced through the first cooling air passage 110.

The combustor casing 102 has a cylindrical shape, and is fixed at the rear end of a compressor, without rotating, in a gas turbine. A plurality of fuel injectors (not shown) are spaced at regular intervals in the circumferential direction of the combustor 100. Gas as fuel is mixed with air, and is then supplied to the fuel injectors in order to perform combustion.

The combustor 100 has a hollow inner region S, and the cooling air supplied through the first cooling air passage 110 flows into the inner region S.

The compressor (not shown) sucks and compresses outside air such that the air becomes high-pressure and low-temperature air, and the air is then supplied to the combustor. The high-pressure air compressed b r the compressor is supplied to the first cooling air passage 110.

The first cooling air passage 110 obliquely extends toward the torque tube 302 in the tangential direction of the combustor casing 102. This enables the complicated layout around the combustor 100 to be simplified and enables foreign substances contained in cooling air to be more easily separated.

For example, it is advantageous to form vortices when cooling air is obliquely supplied in one direction rather than in a vertical downward direction toward the combustor casing 102, on the basis of the drawing, and thus foreign substances contained in the cooling air may be more easily separated.

In more detail, the first cooling air passage 110 is disposed in the tangential direction toward the torque tube 302. Accordingly, cooling air is not moved immediately in the longitudinal direction in the first cooling air passage 110, but the spiral flow of cooling air is circumferentially generated therein.

In this case, foreign substances contained in the cooling air are moved toward the inner region (S) while being partially rubbed against the inner surface of the first cooling air passage.

When the first cooling air passage 110 is opened as described above, the flow of cooling air is changed to a turbulent flow and the flow velocity thereof is increased. As a result, kinetic energy is simultaneously increased, and the foreign substances contained in the cooling air are more easily moved toward the first foreign substance collection unit 200.

The first cooling air passage 110 according to an embodiment may have a reduced diameter in the longitudinal direction thereof. In this case, the rate of change in reduced diameter is not specifically limited, but may vary according to the capacity of the gas turbine.

The first foreign substance collection unit 200 is disposed at a position adjacent to the lower end of the first cooling air passage 110. Accordingly, when cooling air is moved to the inner region (S) through the first cooling air passage 110, a portion of the foreign substances contained in the cooling air is moved into the first foreign substance collection unit 200.

In order to effectively collect foreign substances moved to the first foreign substance collection unit 200 in the embodiment, the first foreign substance collection unit 200 is not configured to have a simple void, but the first foreign substance collection unit 200 is configured to filter the foreign substances contained in cooling air by including a first chamber facing the inner upper portion of the combustor casing 102 and a first filter part provided in the first chamber that will be described later.

Figure 2:
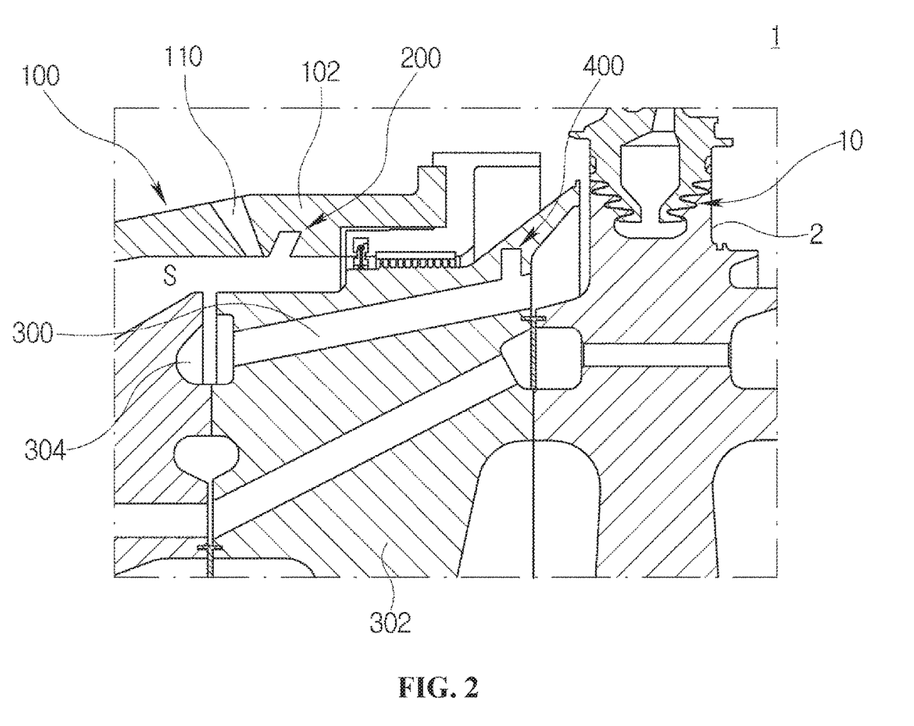
FIGS. 2 to 4 are cross-sectional views illustrating various examples of a first foreign substance collection unit included in the foreign substance removal apparatus for a gas turbine according to embodiments of the present invention.

Referring to FIG. 2, the first foreign substance collection unit 200 according to an embodiment may be obliquely opened at various angles, besides the direction illustrated in FIG. 1. For example, the first foreign substance collection unit 200 may obliquely extend toward the right upper portion of the combustor casing 102 on the basis of the drawing.

In this case, the first foreign substance collection unit 200 is inclined at an angle similar to that of the first cooling air passage 110, or is inclined at a relatively large angle.

When the first foreign substance collection unit 200 obliquely extends as described above, cooling air may be easily introduced into the first foreign substance collection unit 200. That is, when the first foreign substance collection unit 200 is formed at a position illustrated in the drawing in consideration of the flow path of cooling air, the cooling air moved through the first cooling air passage 110 may be easily introduced into the first foreign substance collection unit 200, compared to when the first foreign substance collection unit 200 extends at a right angle as illustrated in FIG. 1. Consequently, the foreign substances contained in the cooling air can be efficiently separated.

Figure 3:
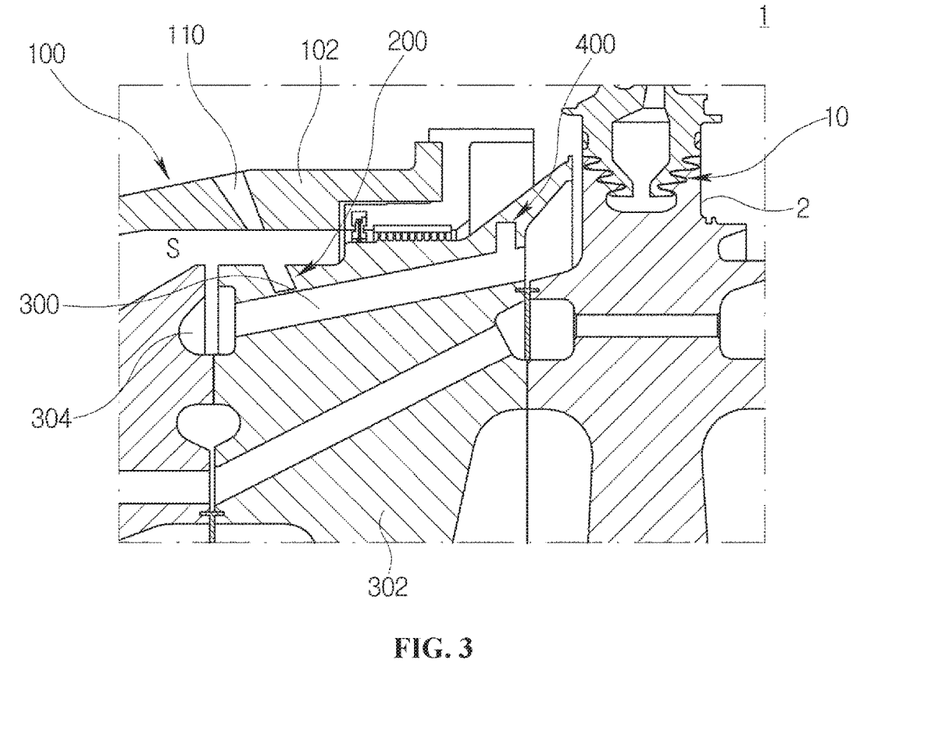

Referring to FIG. 3, the first foreign substance collection unit 200 according to an embodiment may obliquely extend at a position opposite to the first cooling air passage 110, unlike that illustrated in FIG. 2. In more detail, the first foreign substance collection unit 200 obliquely extends rearward of the combustor casing 102 in the circumferential direction thereof, and the extension length thereof is not limited to that illustrated in the drawing.

In this case, since the cooling air discharged from the first cooling air passage 110 may be easily introduced into the first foreign substance collection unit 200, the foreign substances contained in the cooling air can be efficiently filtered.

The first foreign substance collection unit 200 may be located at a position facing the first cooling air passage 110 as described above, or may be located at a position spaced therefrom.

Figure 4:
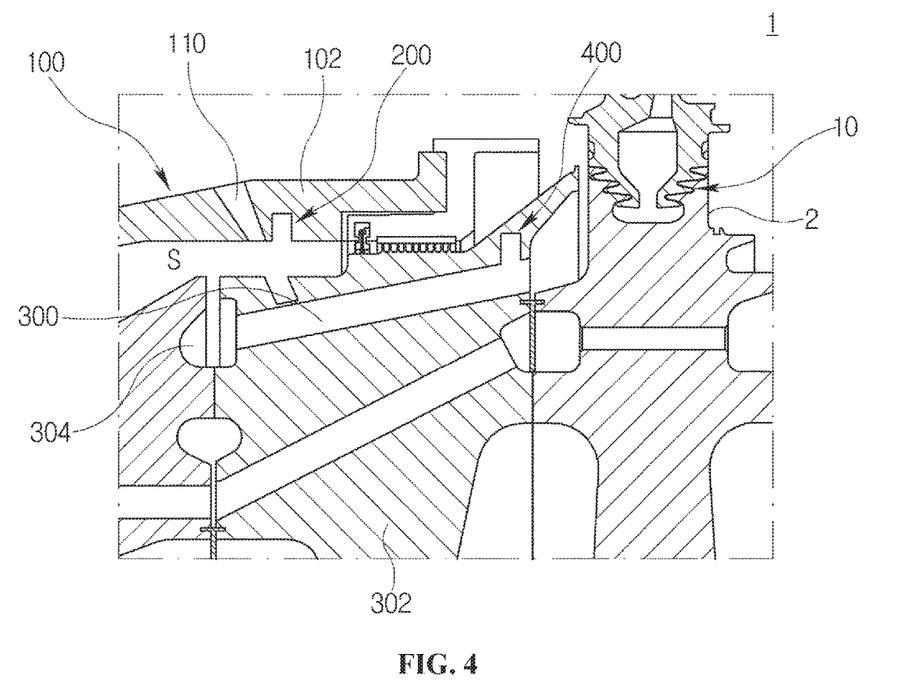

Referring to FIG. 4, the first foreign substance collection unit 200 according to an embodiment may be configured as a dual type of first foreign substance collection unit, unlike the above-mentioned examples. In this case, one first foreign substance collection unit obliquely extends at a position spaced apart from an outlet of the first cooling air passage 110, and the other first foreign substance collection unit is located at a position facing the first cooling air passage 110.

When the first foreign substance collection unit 200 is configured as a dual type of first foreign substance collection unit, it is possible to efficiently filter a large amount of foreign substances, efficiently purify cooling air supplied to the turbine blades 2, and inhibit foreign substances from being piled on the surfaces of the turbine blades 2 when the gas turbine is operated for a long time.

When the above first foreign substance collection unit 200 extends outward in the circumferential direction of the combustor casing 102 by a predetermined length, it is configured to have one of a groove and a slit. When the first foreign substance collection unit 200 is a groove, it has a uniform diameter, and when the first foreign substance collection unit 200 is a slit, it extends in the circumferential direction by a predetermined length. Therefore, the first foreign substance collection unit 200 may collect a larger amount of foreign substances.

In addition, when the first foreign substance collection unit 200 is configured as a dual type of first foreign substance collection unit, the foreign substances in cooling air introduced through the first cooling air passage 110 are collected at each of the circumferential position of the combustor casing 102 and the inner position of the torque tube 302. Therefore, an amount of collection is relatively increased.

Accordingly, it is possible to minimize an amount of foreign substances moved to the first-stage disk 10 adjacent to the combustor 100, and to inhibit unnecessary contamination.

Figure 5:
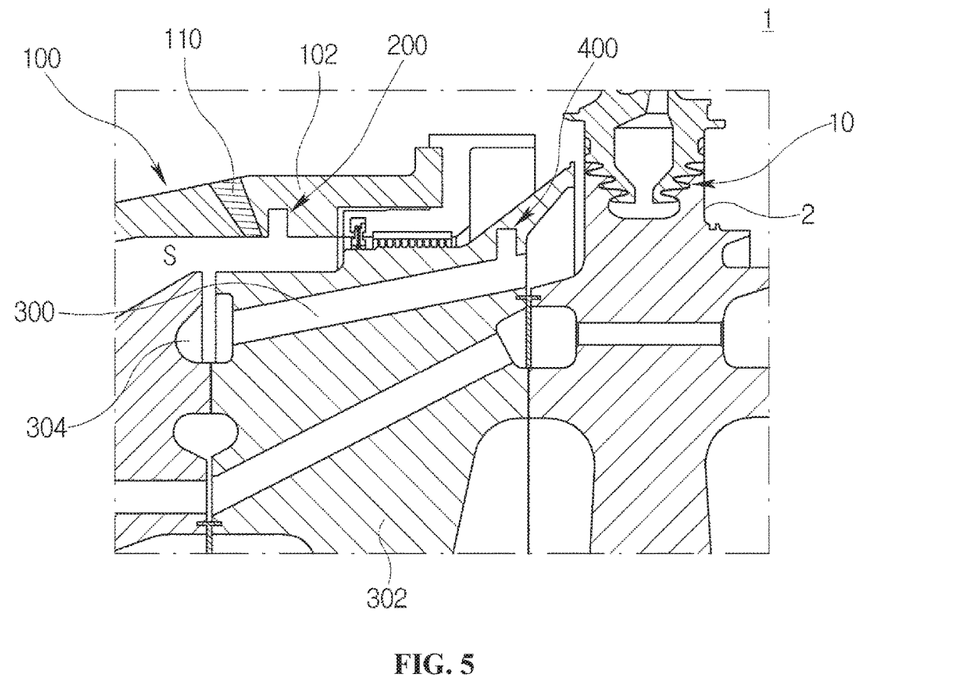
FIG. 5 is a cross-sectional view illustrating another example of a first cooling air passage according to an embodiment of the present invention.
Figure 6:
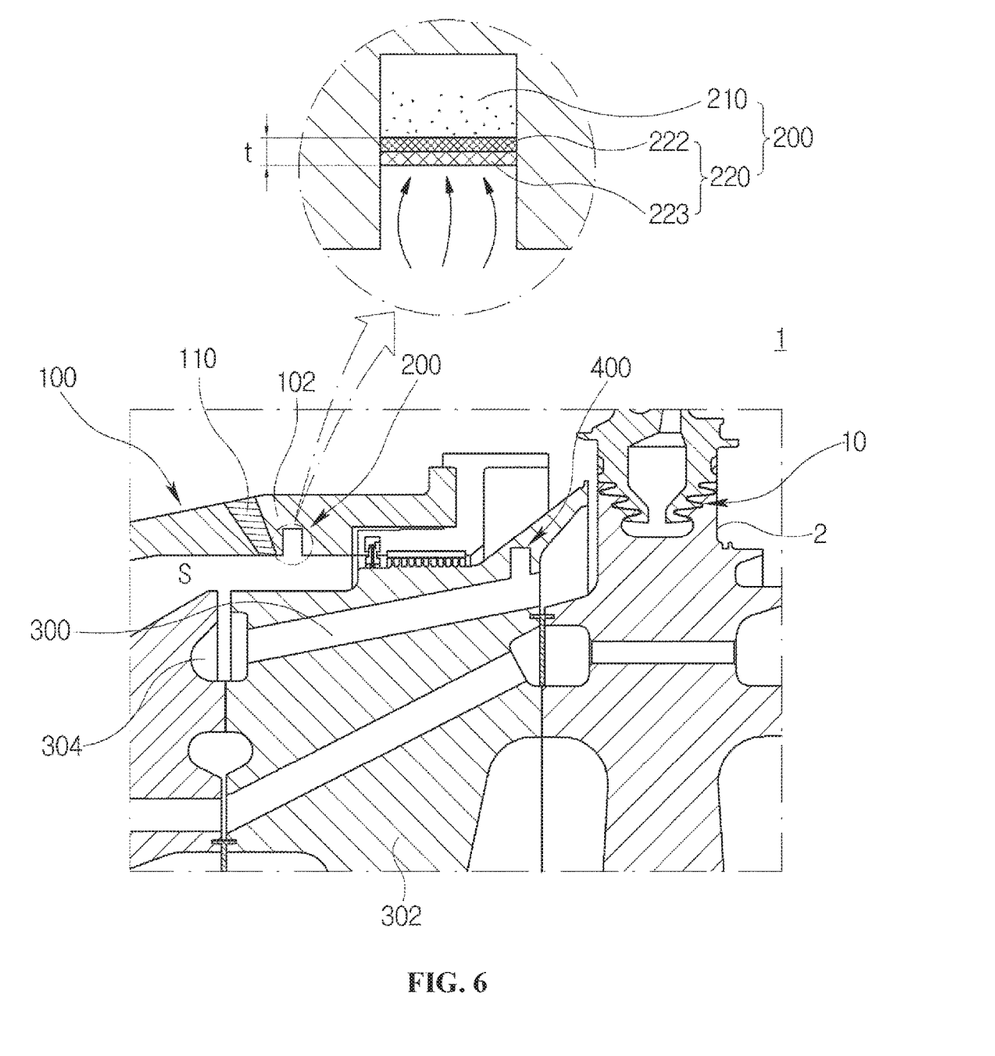
FIG. 6 is a cross-sectional view illustrating the first foreign substance collection unit according to an embodiment of the present invention.

Referring to FIGS. 5 and 6, the first cooling air passage 110 has a spiral groove portion 112 formed therein, and the flow of cooling air may be changed to a vortex by the groove portion 112. Thus, cooling air may stably flow, regardless of movement to the second cooling air passage 300 and the layout of the first and second cooling air passages 110 and 300. (FIGS. 5 and 6 should be amended to indicate the numeral 112.)

The first cooling air passage 110 extends while having a path bent at the lower end thereof toward the second cooling air passage 300 of the torque tube 302. The first foreign substance collection unit 200 serves to filter foreign substances contained in the cooling air supplied through the first cooling air passage 110 via the compressor, and has a ring shape in the circumferential direction of the combustor casing 102.

A first chamber 210 provides a space for storing the foreign substances filtered by a first filter part 220. The first foreign substance collection unit 200 includes the first chamber 210 and the first filter part 220 in order to perform stable cooling and inhibit the surfaces of the turbine blades 2 from being contaminated by blocking the filtered foreign substances from flowing into the turbine blades 2 through the second cooling air passage 300.

To this end, the first filter part 220 includes a plurality of unit filters 222 and 223 provided to filter foreign substances having different sizes. Each of the unit filters 222 and 223 has a dense mesh spacing as directed outward in the circumferential direction of the combustor casing 102.

The unit filters 222 and 223 are spaced apart from each other, and each has a specific mesh in consideration of the sizes of foreign substances. Such a specific mesh is created in a database by previously measuring the sizes of foreign substances in the cooling air supplied through the compressor.

When the unit filters 222 and 223 are provided, different-sized foreign substances contained in cooling air may be stably separated in the first chamber 210, and thus only air required to cool the turbine blades 2 may be supplied to the second cooling air passage 300.

Accordingly, it is possible to reduce foreign substances contained in the cooling air supplied to the turbine blades 2, and to relatively lower the surface temperature of the turbine blades 2 exposed to high-temperature environments by supplying only pure fluid for cooling thereto. In addition, it is possible to reduce cracks on the surfaces of the turbine blades 2 or deformation thereof due to heat concentration, and the gas turbine can have improved efficiency.

For reference, each of the unit filters 222 and 223 is preferably made of stainless steel, which is resistant to corrosion, oxidation, and deformation due to temperature, for long term use, but it may be made of alternative materials having similar desirable properties.

The unit filters 222 and 223 according to the embodiment are in close contact with each other, or are spaced apart from each other. In FIG. 6, the unit filters 222 and 223 are in close contact with each other, and foreign substances are collected in the first chamber 210.

Figure 7:
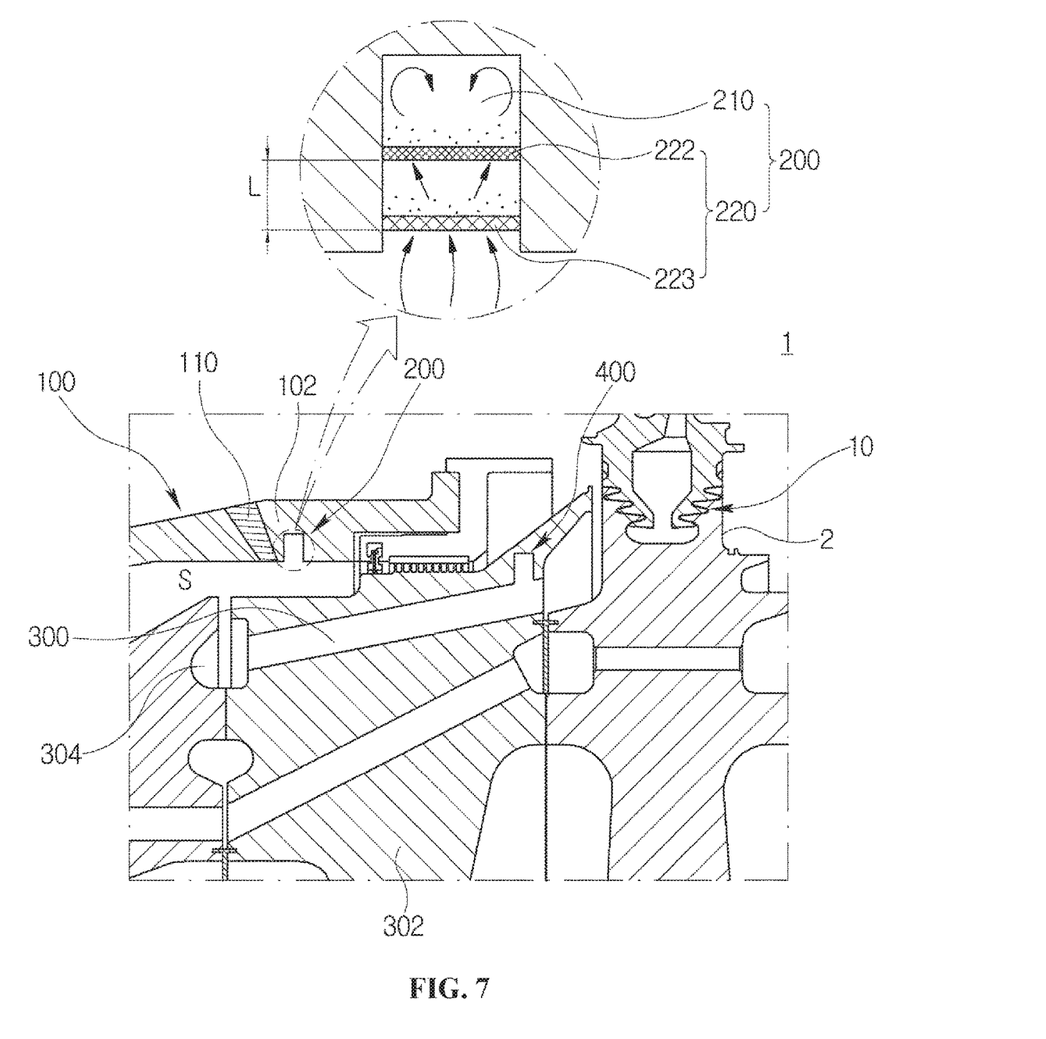
FIG. 7 is a cross-sectional view illustrating a state in which unit filters are spaced apart from each other, according to an embodiment of the present invention.

In FIG. 7, the unit filters 222 and 223 are spaced apart from each other, and a space for collecting foreign substances is defined between the unit filters 222 and 223. In this case, after foreign substances are primarily filtered through one unit filter 223 having a relatively large mesh, they are secondarily filtered through the other unit filter 222 located at the top. Therefore, foreign substances having different sizes may be respectively collected in different spaces.

Accordingly, the foreign substances contained in cooling air can be effectively filtered, and it is possible to minimize an amount of foreign substances moved to the first-stage disk 10 adjacent to the combustor 100.

When the unit filters 222 and 223 are spaced apart from each other, a distance (L) therebetween is relatively greater than that corresponding to the whole thickness (t) of the unit filters 222 and 223. It is advantageous that the space for collection of foreign substances is greater than that corresponding to the whole thickness (t) of the unit filters 222 and 223, considering the condition in which the gas turbine is operated for a long time.

The unit filters 222 and 223 may be arranged horizontally to the axial direction of the combustor 100, or may be obliquely arranged in one direction, on the basis of the drawings, but the present invention is not limited thereto.

Each of the unit filters 222 and 223 has a dense mesh spacing in the circumferential direction, and has a less dense mesh at the center thereof. Thus, the different-sized foreign substances in the cooling air introduced into the first chamber 210 may be effectively filtered.

A first swirler 304 is formed in the torque tube 302, and changes the flow of cooling air supplied to the first cooling air passage 110 to a turbulent flow so as to supply such a flow to the turbine blades 2.

Since the first swirler 304 is formed at a position corresponding to the outlet of the first cooling air passage 110, it may change the flow of cooling air moved through the second cooling air passage 300 to a vortex.

The second cooling air passage 300 includes a plurality of second cooling air passages arranged in the circumferential direction of the torque tube 302, and the number of second cooling air passages corresponds to that of turbine blades 2. Although the diameter of the second cooling air passage 300 is not specifically limited, it is set by numerically calculating a cooling target area of each turbine blade 2 and a flow rate required for cooling.

The second cooling air passage 300 extends so as to be inclined upward toward the turbine blades 2 in the axial direction of the torque tube 302. The turbine blades 2 are located at upper positions than the right end of the second cooling air passage 300, as in the layout illustrated in the drawing.

The second cooling air passage 300 may have a uniform diameter, or may have a reduced diameter as directed toward the turbine blades 2. When the diameter of the second cooling air passage 300 is uniform, a worker may easily process the second cooling air passage 300 thereby improving workability.

In addition, in the case that the diameter of the second cooling air passage 300 is reduced, the flow velocity of cooling air supplied to the turbine blades 2 may be increased, so that the foreign substances adhered to the turbine blades 2 may be effectively removed.

For example, when a certain amount of air is always supplied to the surfaces of the turbine blades 2 after the operation of the gas turbine, the surface temperature of the turbine blades 2 may be lowered. Consequently, it is possible to protect the expensive turbine blades 2, extend the service life thereof, and improve the efficiency of the gas turbine.

Figure 8:
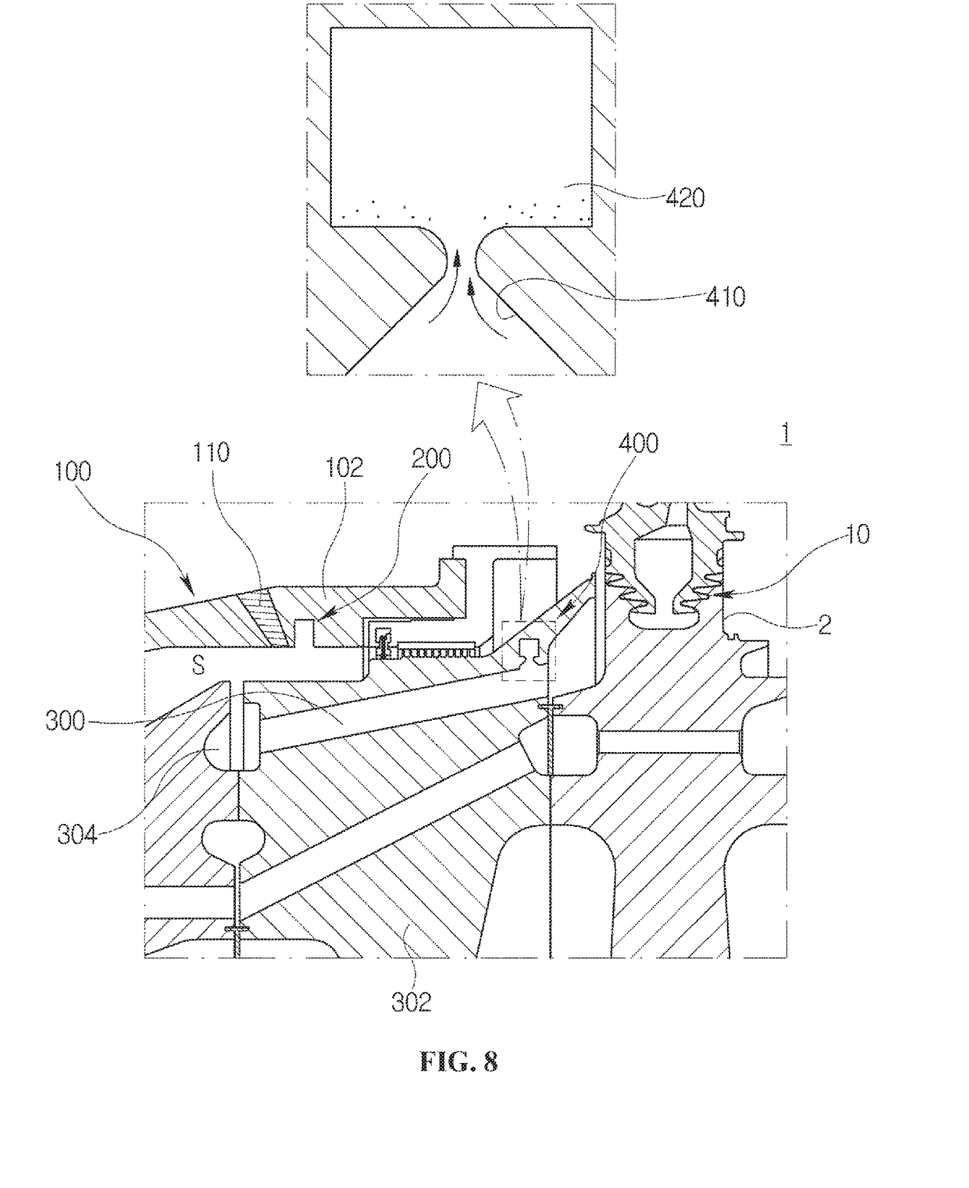
FIG. 8 is a cross-sectional view illustrating a second foreign substance collection unit according to an embodiment of the present invention.

Referring to FIG. 8, the second foreign substance collection unit 400 communicates with the second cooling air passage 300, and is located above the second cooling air passage 300. The second foreign substance collection unit 400 serves to further filter foreign substances, which are not filtered in the first cooling air passage 110, from among the foreign substances contained in cooling air.

The second foreign substance collection unit 400 may have a ring shape or another shape in the state in which it communicates with the second cooling air passage 300.

The second foreign substance collection unit 400 is not limited to having a size illustrated in the drawing, and it may have various sizes. The second foreign substance collection unit 400 is disposed in the circumferential direction of the torque tube 302, and includes a diameter reduction part 410 having a reduced diameter as directed outward from the center thereof in the radial direction of the torque tube 302, and a second chamber 420 which is formed above the diameter reduction part 410 and has a space for storing the collected foreign substances.

For reference, the second foreign substance collection unit 400 according to an embodiment may be located at various angles and positions, similarly to the above first foreign substance collection unit 200. However, the present invention is not limited thereto.

The diameter reduction part 410 has a lateral symmetric structure on the basis of the drawing, and the diameter thereof is reduced as it is directed to the second chamber 420. Since the diameter of the diameter reduction part 410 is reduced as it is directed to the second chamber 420, foreign substances are easily moved to the second chamber 420 by an increase in flow velocity.

The second chamber 420 provides a space for storing and collecting foreign substances. The diameter reduction part 410 may maximally restrict foreign substances moved to the second chamber 420 from flowing into the second cooling air passage 300, and block the foreign substances from flowing into the turbine blades 2.

Since the diameter reduction part 410 has a reduced diameter toward the second chamber 420, and the diameter reduction part 410 has a flat upper surface, foreign substances are stably piled on the upper surface. As a result, after foreign substances are introduced into the second chamber 420, the movement of the foreign substances to the second cooling air passage 300 is blocked.

Accordingly, it is possible to inhibit unnecessary foreign substances from flowing into the turbine blades 2, and to stably cool the turbine blades 2 by supplying only pure cooling air thereto.

In addition, since the foreign substances filtered by the second chamber 420 may be stably stored, no problem relating to storage is caused.

As it is apparent from the above description, in accordance with the exemplary embodiments of the present invention, the surfaces of expensive turbine blades can be inhibited from being contaminated and the turbine blades can be stably cooled all the time, and as a result, the turbine blades can have a long service life and a gas turbine can have improved efficiency. Therefore, the quantity of power generation can be increased and thus power production can be increased.

In addition, foreign substances contained in cooling air can be stably collected in a combustor casing by centrifugal force generated during rotation of the turbine blades.

While the present invention has been described with respect to the specific embodiments, it will be apparent to those skilled in the art that various changes and modifications may be made without departing from the spirit and scope of the invention as defined in the following claims.

What is claimed is:

1. A foreign substance removal apparatus for a gas turbine, comprising:
   a torque tube;
   a combustor casing having an inner surface enclosing a region of the torque tube;
   a first cooling air passage communicating at one end with a hollow region inside the combustor casing and communicating at another end with an outer surface of the combustor casing in order to move cooling air into the hollow region;
   a first foreign substance collection unit including one of a groove or a slit that is formed in the inner surface of the combustor casing and communicates with the hollow region to primarily filter foreign substances contained in the cooling air passing through the first cooling air passage and the hollow region;
   a second cooling air passage having a first end that communicates with the first cooling pair passage and a second end that extends toward a turbine blade, the second cooling air passage formed in the torque tube in the enclosed region to surround a central axis of the torque tube and to have an incline such that the second end is farther from the central axis than the first end; and
   a second foreign substance collection unit that is disposed at the second end of the second cooling air passage and communicates with the second cooling air passage to secondarily filter foreign substances contained in the cooling air introduced through the first cooling air passage.

2. The foreign substance removal apparatus according to claim 1, wherein the first cooling air passage includes a plurality of first cooling air passages arranged in a circumferential direction of the combustor casing, high-pressure air compressed by a compressor provided in the gas turbine being supplied to the first cooling air passage.

3. The foreign substance removal apparatus according to claim 1, wherein the first cooling air passage has a reduced diameter in a longitudinal direction thereof.

4. The foreign substance removal apparatus according to claim 1, wherein the first cooling air passage has a spiral groove portion formed therein.

5. The foreign substance removal apparatus according to claim 1, wherein the first cooling air passage has a path bent at a lower end thereof toward the second cooling air passage of the torque tube.

6. The foreign substance removal apparatus according to claim 1, wherein the groove has a uniform diameter with respect to the central axis of the torque tube and the slit extends in a circumferential direction of the combustor casing by a predetermined length.

7. The foreign substance removal apparatus according to claim 1, wherein the first foreign substance collection unit obliquely extends rearward of the combustor casing in a circumferential direction thereof.

8. The foreign substance removal apparatus according to claim 1, wherein the first foreign substance collection unit is one of a groove and a slit extending inward of the torque tube facing the first cooling air passage by a predetermined length.

9. The foreign substance removal apparatus according to claim 1, wherein:
   the first foreign substance collection unit includes a plurality of first foreign substance collection units extending in a circumferential direction of the combustor casing and in an inward direction of the torque tube, the first foreign substance collection units facing each other; and
   the foreign substances in the cooling air introduced through the first cooling air passage are respectively collected at a circumferential position of the combustor casing and an inward position of the torque tube.

10. The foreign substance removal apparatus according to claim 9, wherein the plurality of first foreign substance collection units are spaced apart from each other in a longitudinal direction of the combustor casing.

11. The foreign substance removal apparatus according to claim 1, wherein the first foreign substance collection unit is disposed in a circumferential direction of the combustor casing, and comprises a first chamber facing an inner upper portion of the combustor casing and a first filter part provided in the first chamber.

12. The foreign substance removal apparatus according to claim 11, wherein the first chamber comprises a plurality of unit filters filtering foreign substances having different sizes.

13. The foreign substance removal apparatus according to claim 12, wherein each of the unit filters has a dense mesh spacing as directed outward in the circumferential direction of the combustor casing.

14. The foreign substance removal apparatus according to claim 12, wherein the unit filters are spaced apart from each other.

15. The foreign substance removal apparatus according to claim 14, wherein when the unit filters are spaced apart from each other, a distance (L) therebetween is relatively greater than that corresponding to a whole thickness (t) of the unit filters.

16. The foreign substance removal apparatus according to claim 1, wherein the second cooling air passage has a uniform diameter.

17. The foreign substance removal apparatus according to claim 1, wherein the second foreign substance collection unit is located above the second cooling air passage.

18. The foreign substance removal apparatus according to claim 1, wherein the second foreign substance collection unit is disposed in the circumferential direction of the torque tube, and comprises:
   a diameter reduction part having a reduced diameter as directed outward from a center thereof in a radial direction of the torque tube; and
   a second chamber formed above the diameter reduction part and having a space for storage of collected foreign substances.

19. The foreign substance removal apparatus according to claim 1, wherein the turbine blade is a first turbine blade mounted to a first-stage disk adjacent to the combustor.

20. The foreign substance removal apparatus according to claim 1, wherein the first foreign substance collection unit communicates with the second foreign substance collection unit in sequence via the hollow region, a swirler formed in the torque tube, and the second cooling air passage.

\* \* \* \* \*